United States Patent

Merklinghaus et al.

[11] Patent Number: 5,975,877
[45] Date of Patent: Nov. 2, 1999

[54] APPARATUS FOR FORMING, PUNCHING AND STACKING DEEP-DRAWN ARTICLES OF THERMOPLASTIC SYNTHETIC MATERIAL

[75] Inventors: Horst Merklinghaus, Stockelsdorf; Frank-Michael Wölk, Klempau, both of Germany

[73] Assignee: Gabler Maschinenbau GmbH, Lübeck, Germany

[21] Appl. No.: 09/062,854

[22] Filed: Apr. 20, 1998

[30] Foreign Application Priority Data

Apr. 21, 1997 [DE] Germany .......................... 197 16 655

[51] Int. Cl.⁶ .................................................. B29C 51/20
[52] U.S. Cl. .................................. 425/403.1; 425/451.4; 425/453; 425/DIG. 5; 425/DIG. 201
[58] Field of Search ........................ 425/DIG. 201, 425/DIG. 5, 398, 400, 451.4, 453, 403.1, 302.1

[56] References Cited

U.S. PATENT DOCUMENTS 3,105,270  10/1963  Fibish ...................................... 425/400
3,247,295  4/1966   Burwell ........................... 425/DIG. 201
3,465,384  9/1969   Barch et al. .................... 425/DIG. 201
4,565,513  1/1986   Kiefer ...................................... 425/398
5,453,237  9/1995   Padovani .............................. 425/403.1

FOREIGN PATENT DOCUMENTS 3346628  3/1986  Germany .

*Primary Examiner*—Harold Pyon
*Assistant Examiner*—Mark A. Wentink
*Attorney, Agent, or Firm*—Friedrich Kueffner

[57] ABSTRACT

An apparatus for manufacturing and stacking deep-drawn articles of thermoplastic synthetic material or the like includes a heating unit, an intermittent foil transporting unit, a rigid upper tool, and a raisable and lowerable as well as pivotable lower tool, wherein the movements of the lower tool are determined by cam discs mounted on a drive shaft and by cam rollers for the cam discs, and a stacking device. The lower tool is arranged linearly movably guided in a pivoted bracket.

4 Claims, 3 Drawing Sheets

APPARATUS FOR FORMING, PUNCHING AND STACKING DEEP-DRAWN ARTICLES OF THERMOPLASTIC SYNTHETIC MATERIAL

BACKGROUND OF THE INVENTION

1. Field of the Invention

The present invention relates to an apparatus for forming, punching and stacking deep-drawn articles of thermoplastic synthetic material or the like. The apparatus includes a heating unit, an intermittent foil transporting unit, a rigid upper tool, and a raisable and lowerable as well as pivotable lower tool, wherein the movements of the lower tool are determined by cam discs mounted on a drive shaft and by cam rollers for the cam discs, and a stacking device.

2. Description of the Related Art

A thermoforming machine of the above-described type is disclosed in DE-C2 33 46 628. In a machine of this type, articles of synthetic materials, such as, margarine containers, drinking cups, container covers, etc., are produced between the tools which can be moved toward each other and apart from each other. The articles are formed in the closed position of the upper and lower tools, the articles are then punched and transported out of the tool in the open position into a stacking device. The upper tool or upper component of this known thermoforming machine is mounted on a rigid transverse bridge, while the lower tool or component is fastened to a vertically movable and pivotable forming table. For making the forming table pivotable, the forming table has bearing pins whose bearings are each arranged in a vertically guided guide piece. The drive is effected by toggle levers which rest with cam rollers against cam discs mounted on a main shaft.

The toggle lever mechanism composed of various lugs for pivoting the entire pivoting table with the lower tool mounted thereon in a vertical guide means which is not pivoted, is very complicated. To ensure that the articles do not come into contact with interfering edges during stacking, such as in the area of the foil transporting unit, a large pivoting angle of approximately 45–90°, typically, 80° is required. The articles which are ejected almost horizontally in this case, must be received in a moving stacking plate which is moved against the lower tool, because otherwise there would be the danger that the articles drop too far downwardly as a result of gravity on their way into the stacking plate and would not be able to enter the stacking plate openings. Not very helpful is another alternative with a stacking plate which is located deeper already from the outset, because in this case articles could change their trajectory angles on their way to the stacking plate.

Finally, an alternative embodiment in which the articles are moved toward the ejector by suction has the disadvantage that the ejector becomes more complicated and also more expensive because of the vacuum plant which would have to be provided. The large pivoting angle of the known thermoforming machine required for the entire pivoting table further makes it necessary to provide expensive rotary-type connections for the cooling water line into the lower water tool, wherein these connections result in significant sealing problems and, thus, maintenance operations.

SUMMARY OF THE INVENTION

Therefore, it is the primary object of the present invention to provide an apparatus or thermoforming machine of the above-described type which does not have the above-mentioned disadvantages. In particular, the apparatus is to have an improved and less complicated lifting and pivoting mechanism and stacking of the finished articles is to be simplified.

In accordance with the present invention, the lower tool is arranged linearly movably guided in a pivoted bracket.

Since, as a result of the fact that the guide means of the lower tool and thus, the lower tool itself are arranged in an also pivotable component of the thermoforming machine, i.e, the pivoted bracket, a very compact machine construction is possible. The pivoted bracket advantageously is composed of two side walls which receive the lower tool, wherein the side walls rest with cam rollers against corresponding cam disks. Consequently, not only the height at which the machine is operated becomes lower but also the packaging and transporting requirements are reduced. The only very small pivoting range, a pivoting movement of about 27° being sufficient, facilitates the connection to media, for example, cooling water, current, etc., through a simple trailing cable installation without rotary connections. In the outwardly pivoted position, the lower tool is freely accessible from all sides which makes it much simpler to exchange tool inserts, for example, when the articles have the same diameter but different heights. Cleaning and maintenance operations are also simplified.

In accordance with a further development of the invention, the lower tool is supported through lifting cam rollers directly on the corresponding lifting cam disks. Consequently, a directly introduced movement sequence is possible for effecting a stroke of about 80 mm for lifting the lower tool.

If, in accordance with another advantageous feature, a three-phase current drive with disk flywheel which is connected through gear means to the drive shaft is used for effecting the lifting and pivoting movement of the lower tool, a relatively small motor can be used because peek torques required for a short period of time can be obtained from a reduction of the rate of rotation of the disk flywheel. At moments when no torque or only a small torque is required, for example, at the upper and lower dead center points of the lower tool movement, the disk flywheel can then be returned to the nominal rate of rotation. On the other hand, it is also possible to use all other conventional drives, such as a servo motor. During forming of the articles, the drive is uncoupled, i.e., the drive and cam disk shaft are uncoupled, and thus, the movement of the tool is stopped.

In accordance with a preferred embodiment of the invention, the thermoforming machine is constructed with a position inclined relative to the ground. Even though the lower tool is pivoted by the cam disks and the cam rollers rigidly connected to the bracket from the forming position into the stacking position, the inclined position of the machine, for example, with a 10% inclination, makes it possible to almost vertically stack the finished articles out of the tool into the stacking plate or stacking device. This also makes it possible in a very simple manner to manufacture not only cups or containers, but also covers, because the stacking possible as a result provides extremely favorable conditions for being able to transport the covers in their most stable position.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
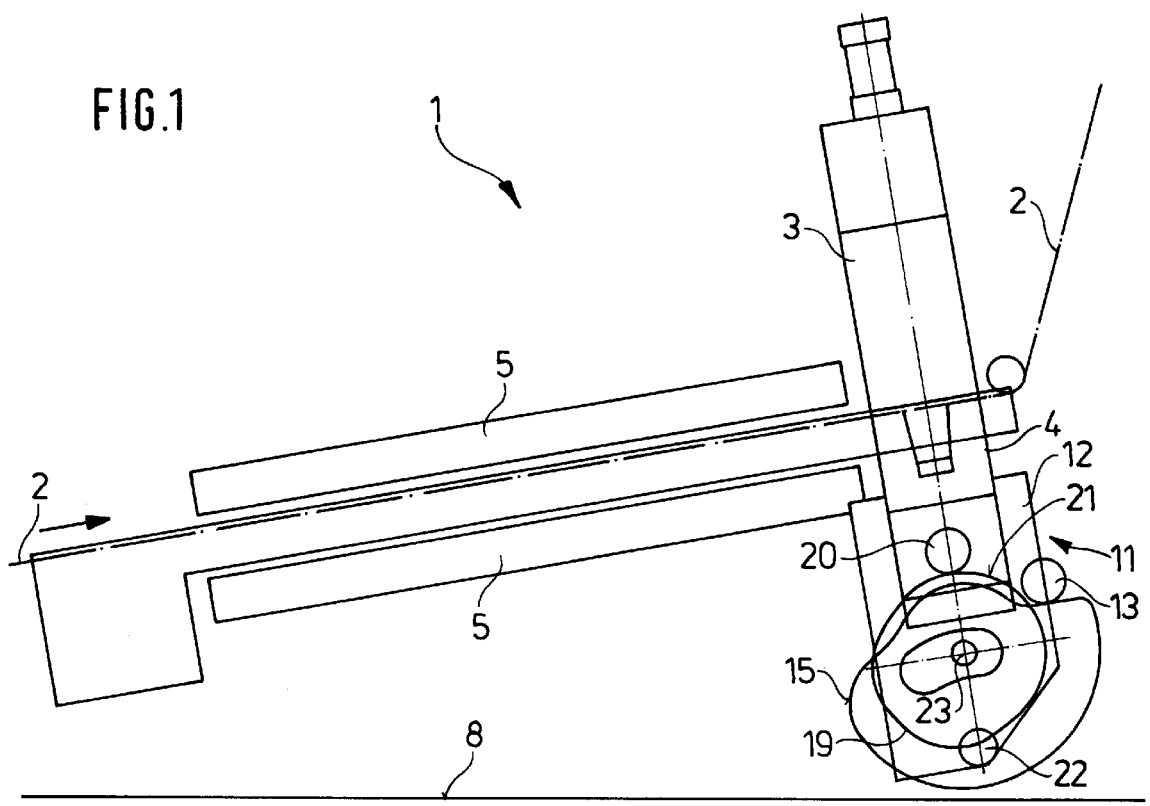
FIG. 1 is a side view of a thermoforming machine arranged in an inclined position, shown with closed tools in the position of operation.
Figure 2:
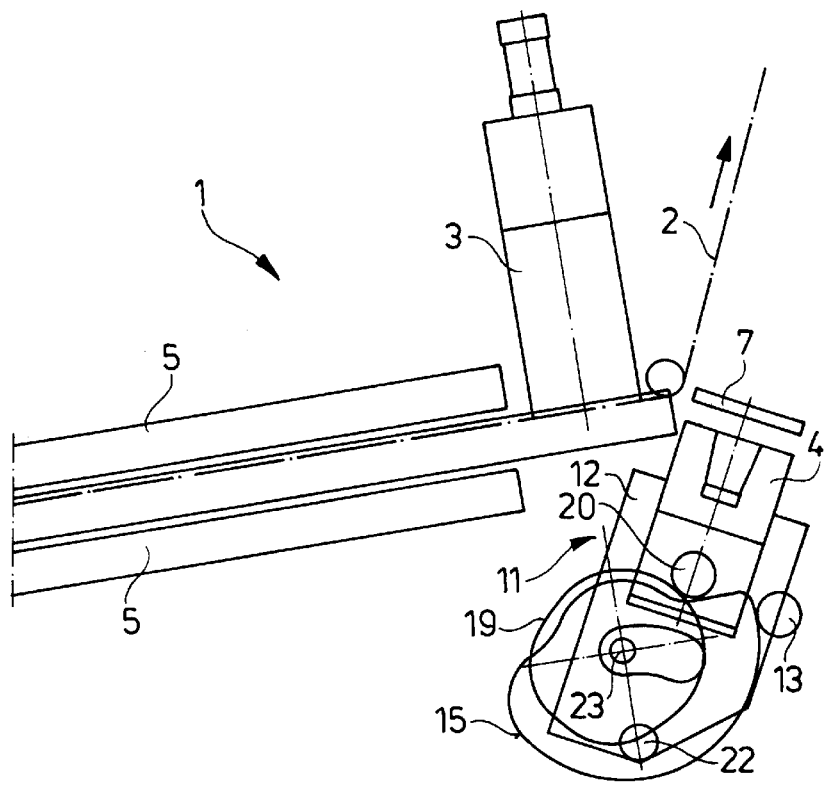
FIG. 2 is a side view of the thermoforming machine of FIG. 1, showing the lower tool outwardly pivoted into the stacking position.

In a thermoforming machine 1 as illustrated in FIG. 1, a foil web 2 of synthetic material is introduced on an inlet side in accordance with the arrow shown in FIG. 1 and is wound up again on the exit side onto a winding roller, not shown. On its path to a machine unit composed of a stationary upper tool 3 and a pivotable lower tool 4, the foil web 2 travels through a heating station 5 of the thermoforming machine 1. The outwardly pivoted position of the lower tool 4 is shown in FIG. 2. As soon as a portion of the foil web 2 corresponding to the forming indentations 6 in the lower tool 4, shown in FIG. 3, has entered between the upper and lower tools 3 and 4, the articles are formed and punched in the closed tools 3, 4 shown in FIG. 1. As soon as the articles are finished, the lower tool 4 is pivoted into the stacking position shown in FIG. 2 and the articles are placed on a stacking device 7. The inclined position of the thermoforming machine 1 with an inclination of about 10° relative to the ground 8 makes it possible to almost vertically stack the finished articles out of the lower tool 4 into the stacking device or stacking plate 7.

Figure 3:
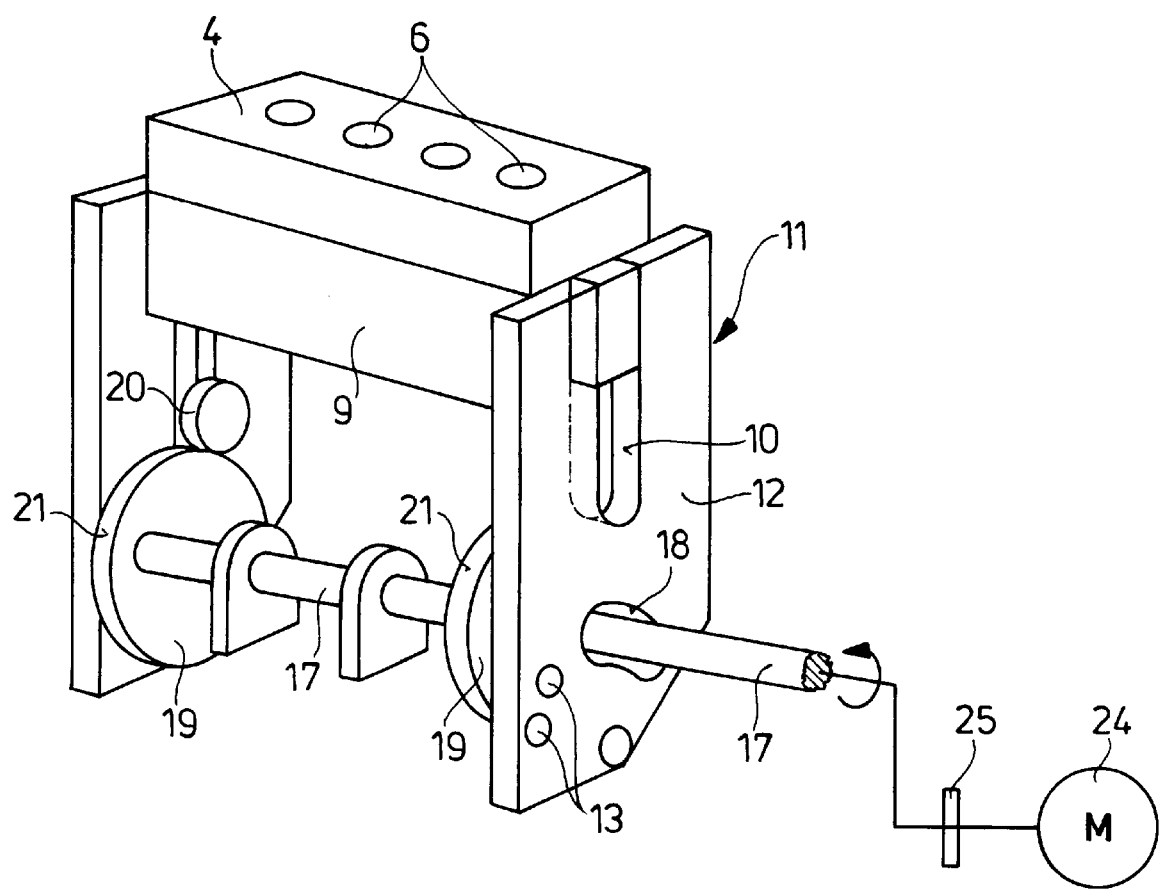
FIG. 3 is a simplified perspective view of the lower tool of the thermoforming machine of FIG. 1, wherein the lower tool is arranged in a bracket composed of two oppositely located side walls, only one of the side walls being shown for clarity's sake.
Figure 4:
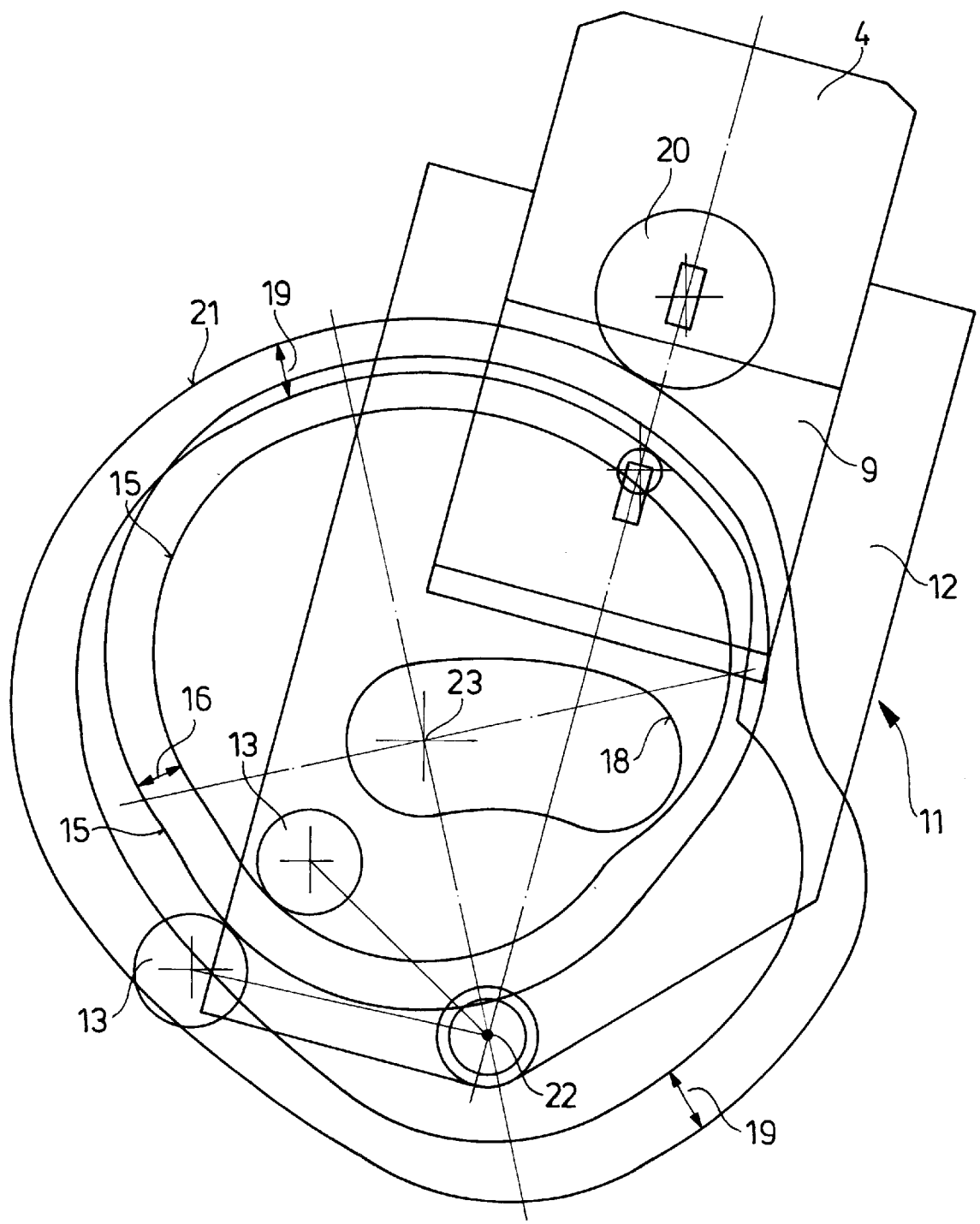
FIG. 4 is a side view, on a larger scale, showing a detail of the thermoforming machine of FIG. 1, i.e., the raisable and lowerable as well as pivotable lower tool and a side wall of the bracket with corresponding cam disks and cam rollers.

For carrying out the lifting and pivoting movements, the lower tool 4 with its forming table 9 shown in FIG. 3 is arranged so as to be linearly movable in a pivoting bracket 11. The pivoting bracket 11 is composed of two oppositely located side walls 12, wherein FIG. 3 shows only one side wall for clarity's sake. As shown in FIGS. 1, 2 and 4, two cam rollers 13 are fastened in each side wall 12, wherein the cam rollers 13 rest against corresponding pivoting cam disks 15 which, again for clarity's sake, are only shown with their inner curves in FIGS. 1 and 2, and which define pivoting curves for the outwardly pivotable lower tool 4; the range of pivoting results from the inner and outer curves of the pivoting can disks 15 in accordance with double arrow 16 shown in FIG. 4.

The pivoting cam disks 15 are mounted on a drive shaft 17, shown in FIG. 3, which extends through kidney-shaped openings 18 of the side walls 12 of the bracket 11 and additionally supports the lifting cam disks 19 of the lower tool 4, as schematically shown in FIG. 3. The forming table 9 of the lower tool 4 rests directly with cam rollers 20 on the lifting cam disks 19, wherein the shape of the cam disks 19 determines the lifting curve 21. The pivot point 22 for pivoting the bracket 11 or the side walls 12 is always located in a line with the point 23 of rotation of the drive shaft 17.

The lifting movement of the lower tool 4 and the pivoting movement of the pivoting bracket 11 are produced by a three-phase current motor 24 which is connected to the drive or cam disk shaft 17 through a coupling/brake combination, not shown, and a gear unit, also not shown.

As schematically illustrated in FIG. 3, the three-phase current motor 24 is equipped with a disk flywheel 25 which makes it possible to obtain from a reduction of the rate of rotation peak torques which are required for a short period of time. In order to avoid that the cam roller 13 lifts off from the pivoting cam disks 15 in the case of accelerations greater than 1 g, channel curves or separate outer or inner curves can be provided. Alternatively, a combination of simple inner curves with additional air springs is possible, for example, with pneumatic cylinders which press the cam rollers against the curve.

While specific embodiments of the invention have been shown and described in detail to illustrate the inventive principles, it will be understood that the invention may be embodied otherwise without departing from such principles.

We claim:

1. An apparatus for shaping, punching and stacking deep-drawn articles of thermoplastic synthetic material or the like, the apparatus comprising a rigid upper tool, a liftable and lowerable as well as pivotable lower tool mounted opposite the upper tool, pivoting cam disks mounted on a drive shaft and cam rollers in contact with the cam disks for effecting pivoting movements of the lower tool between a first position in alignment with the upper tool and a second position out of alignment with the upper tool, and a stacking device for receiving the articles from the lower tool when the lower tool is in the second position thereof, an intermittent foil transporting means for transporting the foil between the upper and lower tools, and a heating means for heating the foil upstream of the upper and lower tools, the apparatus further comprising a pivoting bracket, wherein the lower tool is guided in the pivoting bracket so as to be movable in a linear direction, wherein the pivoting bracket comprises two side walls with guide means for receiving the lower tool, and wherein the cam rollers in contact with the pivoting cam disks are connected to the side walls.

2. The apparatus according to claim 1, wherein the lower tool comprises lifting cam rollers directly resting on lifting cam disks mounted on the drive shaft.

3. The apparatus according to claim 1, comprising a three-phase current motor with a disk flywheel connected through gears to the drive shaft for effecting the lifting and pivoting movements of the lower tool.

4. The apparatus according to claim 1, wherein the apparatus has an inclined position relative to a horizontal direction.

* * * * *